(12) United States Patent
Greese et al.

(10) Patent No.: US 7,467,700 B2
(45) Date of Patent: Dec. 23, 2008

(54) POWER TOOL WITH CLUTCH

(75) Inventors: Oliver Greese, Filderstadt (DE); Ivica Kolaric, Esslingen (DE)

(73) Assignees: C. & E. Fein GmbH (DE); Fraunhofer-Gesellschaft zur Foerderung der angewandten Forschung e.V. (DE)

( * ) Notice: Subject to any disclaimer, the term of this patent is extended or adjusted under 35 U.S.C. 154(b) by 405 days.

(21) Appl. No.: 11/294,876

(22) Filed: Dec. 6, 2005

(65) Prior Publication Data

US 2006/0124332 A1 Jun. 15, 2006

(30) Foreign Application Priority Data

Dec. 6, 2004 (DE) .................. 10 2004 059 814

(51) Int. Cl.
*F16D 25/04* (2006.01)
(52) U.S. Cl. .................. 192/66.31; 192/88 A; 192/91 A
(58) Field of Classification Search .............. 192/66.31
See application file for complete search history.

(56) References Cited

U.S. PATENT DOCUMENTS

| | | | |
|---|---|---|---|
| 2,666,512 A | 1/1954 | Codier | 198/82 |
| 5,159,522 A | 10/1992 | Gray | 361/154 |
| 5,553,828 A | 9/1996 | Jaenker | 251/129.01 |
| 5,671,905 A | 9/1997 | Hopkins, Jr. | 251/129.01 |
| 6,109,145 A * | 8/2000 | Habermehl | 81/434 |
| 6,555,945 B1 * | 4/2003 | Baughman et al. | 310/300 |

FOREIGN PATENT DOCUMENTS

| | | |
|---|---|---|
| DE | 198 18 156 | 10/1999 |
| EP | 342264 A2 * | 11/1989 |
| EP | 1 277 905 | 1/2003 |
| JP | 01124830 | 5/1989 |

* cited by examiner

*Primary Examiner*—Richard M. Lorence
(74) *Attorney, Agent, or Firm*—St. Onge Steward Johnston & Reens LLC

(57) ABSTRACT

The invention discloses a power tool comprising a clutch having a first clutch element and a second clutch element which are seated for rotation one relative to the other and between which a torque can be transmitted. The clutch comprises an actuating element engaging at least one of the first and second clutch elements for moving the clutch between an engaged position for effecting power transmission from a drive shaft to an output shaft, and between a released position wherein there is no power transmission to said output shaft. The actuating element comprises a nanotube actuator.

19 Claims, 1 Drawing Sheet

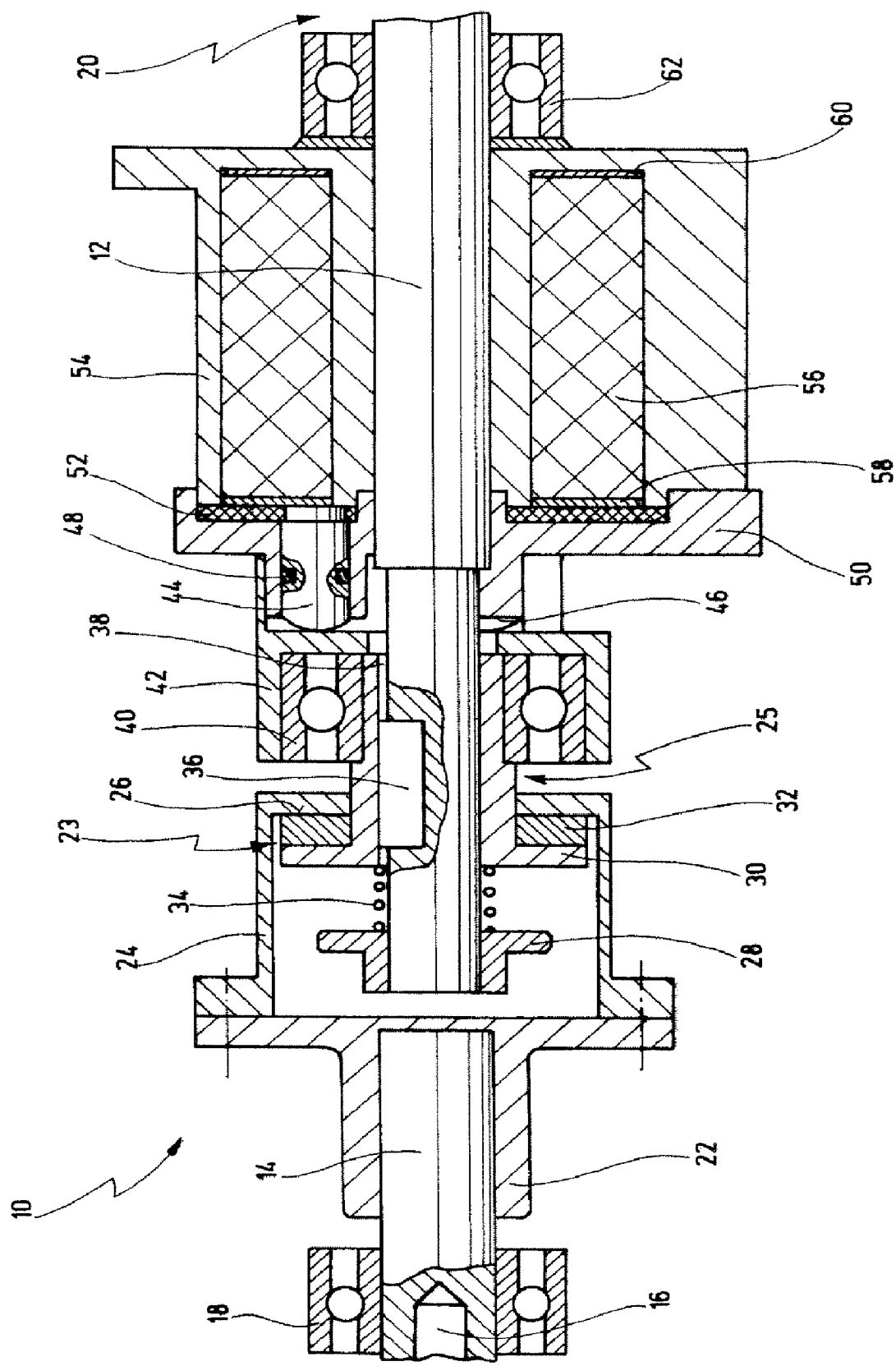

7,467,700 B2

POWER TOOL WITH CLUTCH

CROSS-REFERENCE TO RELATED APPLICATIONS

The present application claims priority of German patent application No. 10 2004 059 814.2 filed on Dec. 6, 2004.

BACKGROUND OF THE INVENTION

The present invention relates to a power tool comprising a clutch movable between an engaged position in which power is transmitted from a drive shaft to an output shaft, and a released position in which there is no power transmission to the output shaft. The invention further relates to a clutch having an actuator for moving the clutch between an engaged position and a released position.

U.S. patent Ser. No. 5,159,522 discloses a clutch cooperating with a drive shaft and having a first disk-shaped clutch element from which the torque of a drive shaft can be transmitted via a friction lining to an associated second clutch element which latter is connected with a drive shaft. The clutch is designed as an electromagnetic clutch wherein a contact pressure is produced by a coil when the latter is suitably driven via a transistor circuit.

A clutch of that kind can be used for numerous operating functions. It is, however, a disadvantage of such a clutch that the power input required for achieving sufficient torque transmission is quite considerable.

There have further been known in the art numerous other clutch types comprising various actuating elements. In the automotive industry, for example, hydraulically operated clutches have been known for many years. Other clutches known include, for example, electric motor-operated clutches and, of course, mechanically operated clutches that are actuated by a lever or the like.

However, power tools, in particular hand held power tools, such as nut runners having a preset shut-off-torque, at which torque transmission is interrupted, need very compact clutches that allow for a high torque transmission, are very reliable, light-weight and have a low power consumption if electrically activated.

SUMMARY OF THE INVENTION

In view of this, it is a first object of the present invention to disclose a power tool comprising a clutch for interrupting torque transmission having a quick response and being of compact and light-weight design.

It is a second object of the invention to disclose a power tool comprising a clutch for interrupting torque transmission allowing for a high torque transmission.

It is a third object of the invention to disclose a hand-held power tool comprising a clutch which can be activated electrically.

It is a forth object of the invention to disclose a hand-held power tool comprising a clutch which can be activated electrically and has a low power consumption, in particular when powered by accumulators.

It is a fifth object of the invention to disclose a power tool comprising a clutch which can be activated very reliably for interrupting torque transmission e.g. when a predefined torque for tightening a screw has been reached.

It is a sixth object of the invention to disclose a clutch which can be moved by an actuating element between an engaged and a released position and which can be activated very quickly and reliably.

These and other objects of the invention are achieved by providing a clutch having an actuating element for moving the clutch between an engaged and a released position, wherein the actuating element comprises a nanotube actuator the volume change of which effected by a voltage is translated into a movement effecting an engagement or a release of the clutch.

According to the invention the nanotube actuator for the actuating element allows rapid actuation of the clutch with very low power input. Very low voltages are already sufficient to operate the clutch. The clutch can be operated with high precision and provides high reliability in continuous operation even after numerous actuating cycles. And the clutch is also suited for transmitting high torques of the order of 10 Nm or over, which are especially encountered with hand-held power tools.

The clutch according to the invention generally may have any desired structure. It may be configured, for example, as a disk clutch, as a cone friction clutch, as a jaw clutch, as a gear clutch, as a dog clutch or as a switchable overrunning-spring clutch. Also the clutch may be designed for force-locking and/or form-locking power transmission.

According to a preferred further development of the invention, the actuating element comprises a carbon nanotube actuator.

According to an advantageous further development of the invention, the nanotube actuator comprises at least one layer in which nanotubes are arranged with preferred orientation.

The nanotube actuator may in this case comprise at least one layer of single-wall or multi-wall carbon nanotubes or nanotubes consisting of other inorganic components, such as BN, $MoS_2$ or $V_2O_5$.

The use of carbon nanotubes permits considerably higher forces to be generated than the previously known polymer and piezo actuators. Also carbon nanotubes can be operated with a very low supply voltage of approximately 1 Volt, while polymer actuators require supply voltages of 70 to 300 Volts, and piezo actuators even require supply voltages of up to 1000 Volts. Further, no overshoot behavior is encountered with carbon nanotubes.

Due to the oriented arrangement of the nanotubes, with a preferred direction, improved activation characteristics can be achieved.

The nanotube actuator may comprise at least one layer comprising nanotubes or nanotube fibers structured by a CVD process.

According to another preferred embodiment of the invention, the nanotube actuator comprises at least one layer of nanotubes epitaxially grown between mutually parallel plates.

This allows especially high capacity and high efficiency of the actuator to be achieved.

Basically, however, a stacked-layer structure of the actuator is likewise possible.

Preferably, the nanotube actuator, together with its electrolyte, is sealingly received in a housing, and any expansion in volume of the electrolyte is converted via a diaphragm into an axial movement of at least one piston.

As any application of voltage will lead to both axial and radial expansion of the nanotube actuator, it is thus possible to convert the expansion in volume into an axial movement by hydraulic transmission, whereby an expansion of 1%, for example, in all three directions can be converted into an axial movement of approximately 3%.

The nanotube actuator may, for example, consist of a plurality of annular disk elements, stacked one upon the other and connected in series, which permits the required supply voltage to be reduced. The number of stacked disks (stacking height) depends on the displacement required for disengaging the clutch and on the hydraulic transmission ratio between the nanotube actuator and the surface area of the pistons on which the diaphragm acts.

According to an advantageous further development of the invention, the actuator is arranged for disengaging the two clutch elements and acts against the action of a biasing force by which active engagement of the clutch elements is achieved when the actuator is in its inoperative condition.

This provides the advantage that in the engaged condition of the clutch power transmission as such is not effected by the nanotube actuator but rather by a biasing force provided, for example, by a suitably sized spring.

A power tool according to the invention comprises a drive shaft and an output shaft, with a clutch of the kind according to the invention provided between them for power transmission. The actuator is designed in this case for axial movement of the clutch elements one relative to the other, and acts against a restoring force acting between the clutch elements.

Preferably, the clutch elements are urged into an engaged position by a restoring force, the actuator being designed to cause a relative movement between the two clutch elements into a disengaged position in which power transmission between the clutch elements is interrupted.

This provides the advantage that the nanotube actuator needs to be actuated only for interrupting the interaction between the two clutch elements.

According to an advantageous further development of the invention, voltage can be applied to the actuator via a sliding-contact connection.

The clutch may be configured as a disk clutch, for example, with at least one of the clutch elements comprising a friction lining for power transmission.

According to an advantageous further development of the power tool according to the invention, the output shaft has one end rotatably seated on the drive shaft, and comprises a first clutch element and an associated second clutch element, connected for common rotation with the drive shaft, that can be axially displaced via the nanotube actuator for disengaging the two clutch elements and for transferring them to an open position.

This guarantees a simple, compact and reliable structure.

Basically, the reverse action is of course likewise possible, in which case actuation of the nanotube actuator by application of a voltage causes the clutch to be engaged.

It is understood that the features of the invention mentioned above and those yet to be explained below can be used not only in the respective combinations indicated, but also in other combinations or in isolation.

Further features and advantages of the invention will become apparent from the description that follows of a preferred embodiment of the invention, with reference to the drawing. The single FIGURE shows a simplified representation of an electric tool according to the invention with a clutch according to the invention.

BRIEF DESCRIPTION OF THE DRAWING

The only FIGURE shows a simplified longitudinal section of a power tool according to the invention.

DETAILED DESCRIPTION OF THE INVENTION

In the drawing a power tool according to the invention is indicated generally by reference numeral 10.

The illustrated tool may be a hand-held screw runner, for example, provided with a torque-controlled electrically operated clutch, which is generally indicated by reference numeral 23. Such a screw runner may be used, for example, for tightening a screw connection with a precise torque. A torque sensor (not shown) may be provided for this purpose for actuating the clutch 23 when a predetermined torque is reached so as to interrupt transmission of the torque.

The electric tool 10 according to the invention comprises a drive shaft 12, which is driven by an electric motor indicated schematically by reference numeral 20, if necessary via a gearing. The rotary movement of the drive shaft 12 can be transmitted via the clutch 23 to an output shaft 14 on which a tool can be attached, for which purpose a tool holder 16 is indicated schematically in the drawing.

The tool end of the output shaft 14 is seated in a bearing 18, while its end facing the drive shaft 12 is connected with a flange 22 for common rotation with the latter. A first sleeve-like clutch element 24 of the clutch 23 is connected with the flange 22 by a screw connection. A second clutch element 30, being connected with the drive shaft 12 for common rotation with it, is seated for axial displacement on the section of the drive shaft 12 facing the output shaft 14. The second clutch element 30 likewise has the shape of a flange and is guided for axial displacement on the surface of the drive shaft 12.

For realizing the connection for common rotation with the drive shaft 12, there is provided a featherkey 36, received on the drive shaft 12, which slidably engages in a receiving groove 38 in the second clutch element 30. The second clutch element 30 comprises a disk-shaped friction lining 32 which coacts with an associated friction lining 26 of the first clutch element for permitting force-locking power transmission between the two clutch elements 24, 30.

A central bore of the first clutch element 24 rests on the outer surface of a cylindrical section of the first clutch element 30, being thereby rotatably guided. A bushing 28 is attached to the end of the drive shaft 12 that faces away from the output shaft 14. Between the bushing 28 and the end face of the second clutch element 30 facing it, there is provided a spring element 34 by means of which the second clutch element 30 is biased toward the friction surface 26 of the first clutch element 24. The spring element 34 may for example take the form of a helical spring, as shown in the drawing, or of a disk spring or the like. The spring element 34 acts to urge the friction surface 32 of the second clutch element 30 against the coacting friction surface 26 of the first clutch element 24 so that the contact pressure required for transmission of the torque is predefined by the strength of the spring element 34.

The clutch 23 comprises an actuating element, generally indicated by reference numeral 25, which in the embodiment according to the invention comprises a nanotube actuator 56. The nanotube actuator 56 is sealably received, together with an electrolyte, in a housing 54 which coaxially encloses that section of the drive shaft 12 that faces away from the output shaft 14.

When a voltage is applied, the nanotube actuator 56 expands in all three directions, thereby displacing the electrolyte which is sealed by a seal (diaphragm 52) on its side facing the clutch. The diaphragm 52 is contacted by three pistons 44 the axial displacement of which is transmitted to a bearing housing 42. A bearing 40 accommodated in that housing converts that movement into an axial displacement of the second clutch element 30 in a direction opposite to the action of the spring element 34. Thus, expansion of the nanotube actuator 56 causes the second clutch element 30 to be axially displaced in a disengaging direction so that the interaction between the friction element 32 and the associated friction surface 26 is interrupted and the clutch 23 is disengaged.

The hydraulic transmission by means of the electrolyte has the effect to convert the expansion in volume of the nanotube actuator 56 in all three spatial directions into an axial movement.

The housing 54 for the nanotube actuator 56 is supported on a bearing 62, on the side of the drive shaft 12 that faces away from the output shaft 14, and comprises an annular space in which the nanotube actuator 56 is received. The nanotube actuator 56 comprises carbon nanotubes, which have been epitaxially grown by a CVD process in oriented arrangement between two end plates 58, 60, or consists, as has been mentioned before, of stacked carbon nanotubes in the form of annular disks. The electrolyte may be configured as solution of alkaline-alkaline earth, aluminum and metal salts, of halides, nitrates, sulfates, phosphates, dihydrogen phosphates, hydrogen phosphates, halogenates, per-halogenates, hydroxides, acetates, oxalates or acids or mixtures thereof.

For example, an aqueous solution of $Na_2SO_4$ or $Na_2HPO_4$ or $Na_2PO_4$ or $KCl$ may be used, and the concentration may be varied between 0.1 mol and 1 mol, for example. High maximum forces are achieved, for example, with 1 mol of $KCl$ and 1 mol of $Na_2SO_4$.

On the side facing away from the bearing 62, the nanotube actuator 56 is sealed toward the outside by a seal 52 which acts as a diaphragm on the three associated pistons 44. The housing 54 is screwed to a cover 50 in which the pistons 44 are received, with a seal 52 placed between the two elements. There may be provided, for example, three pistons 40 arranged at a uniform angular spacing of 120° and axially parallel to, and radially set off to the outside from, the lengthwise axis of the drive shaft 12. In the upper half of the FIGURE, a piston 44 can be seen whereas a further piston 46 is indicated schematically in the lower part of the drawing. The pistons 44, 46 are received in axial bores of the cover 50 for longitudinal displacement, and bear against the end face of the nanotube actuator 56 or the seal (diaphragm) 52, respectively.

The pistons 44 are sealed relative to their receiving bores in the cover 50 by O-ring seals 48. Thus, generally complete sealing of the nanotube actuator in the housing 54 and the cover 50 toward the outside is achieved. The plates 58, 60 of the nanotube actuator 56 can be suitably connected to an external voltage source, via sliding contacts (not shown), for permitting actuation of the nanotube actuator.

The pistons 44, 46 transmit a voltage-induced displacement to the end face of the bearing housing 42 in which the second clutch element 30 is seated in a bearing 40 designed as ball bearing.

Thus, axial displacement of the pistons 44, 46 is directly converted into a disengaging movement of the second clutch element 30.

Due to the fact that the nanotube actuator 56 responds very quickly even to minor voltage pulses of the order of 1 Volt, extremely precise and rapid response of the clutch 23 can thus be ensured in order to produce a disengaging movement or engagement of the clutch 23.

What is claimed is:
1. A power tool comprising:
    a motor-driven drive shaft;
    an output shaft for driving a tool receptacle;
    a clutch arranged between said drive shaft and said output shaft, said clutch having an engaged position in which torque is transmitted from said drive shaft to said output shaft, and having a released position wherein torque transmission from said drive shaft to said output shaft is interrupted;
    wherein said clutch comprises
        a first clutch element;
        a second clutch element cooperating with said first clutch element for transmitting a torque when being in said engaged position, said first and second clutch elements being seated for rotation one relative to the other; and
        an actuating element comprising a nanotube actuator engaging at least one of said first and second clutch elements for moving said at least one clutch element between said engaged position and said released position;
    wherein said first clutch element is connected to said output shaft for common rotation therewith, wherein said second clutch element is connected to said drive shaft for common rotation therewith, and wherein said nanotube actuator is configured for axially moving one of said first and second clutch elements from said engaged position into said released position against the action of a restoring force; and
    wherein said nanotube actuator, together with an electrolyte, are sealingly received in a housing, said housing comprising an opening sealed by a diaphragm, said diaphragm engaging at least one piston for translating a volume expansion of said electrolyte into an axial movement of said at least one piston, said nanotube actuator including at least one layer with nanotubes epitaxially grown between mutually parallel plates.

2. A power tool comprising:
    a motor-driven drive shaft;
    an output shaft for driving a tool receptacle;
    a clutch arranged between said drive shaft and said output shaft, said clutch having an engaged position in which torque is transmitted from said drive shaft to said output shaft, and having a released position wherein torque transmission from said drive shaft to said output shaft is interrupted;
    wherein said clutch comprises
        a first clutch element;
        a second clutch element cooperating with said first clutch element for transmitting a torque when being in said engaged position, said first and second clutch elements being seated for rotation one relative to the other; and
        an actuating element comprising a nanotube actuator engaging at least one of said first and second clutch elements for moving said at least one clutch element between said engaged position and said released position, said nanotube actuator including at least one layer with nanotubes epitaxially grown between mutually parallel plates.

3. The power tool of claim 2, further comprising means for translating a volume change of said nanotube actuator into an axial movement of said first and second clutch elements one relative to the other.

4. The power tool of claim 3, further comprising means for generating a restoring force directed against said axial movement.

5. The power tool of claim 4, wherein said first clutch element is connected to said output shaft for common rotation therewith, wherein said second clutch element is connected to said drive shaft for common rotation therewith, and wherein said nanotube actuator is configured for axially moving one of said first and second clutch elements from said engaged position into said released position against the action of said restoring force.

6. The power tool of claim 5, wherein at least one of said first and second clutch elements further comprises a friction lining for effecting torque transmission between said drive shaft and said output shaft when being in said engaged position.

7. The power tool of claim 3, wherein said nanotube actuator is configured for moving said first and second clutch elements from said engaged position into said released position when being activated.

8. The power tool of claim 3, wherein said first and second clutch elements are urged by a spring element into said engaged position.

9. The power tool of claim 3, wherein said nanotube actuator, together with an electrolyte, are sealingly received in a housing, said housing comprising an opening sealed by a diaphragm, said diaphragm engaging at least one piston for translating a volume expansion of said electrolyte into an axial movement of said least one piston.

10. The power tool of claim 9, wherein said first clutch element is connected to said output shaft for common rotation therewith, wherein said second clutch element is connected to said drive shaft for common rotation therewith, and wherein said nanotube actuator is configured for axially moving one of said first and second clutch elements from said engaged position into said released position against the action of a restoring force.

11. The clutch of claim 2, wherein said clutch is configured as a clutch selected from the group consisting of a disk clutch, a cone friction clutch, a jaw clutch, a gear clutch, a dog clutch and a switchable overrunning-spring clutch.

12. The power tool of claim 11, wherein at least one of said first and second clutch elements further comprises a friction lining for effecting torque transmission between said drive shaft and said output shaft when being in said engaged position.

13. The power tool of claim 2, wherein said actuating element comprises a carbon nanotube actuator.

14. The power tool of claim 2, wherein said nanotube actuator comprises at least one layer in which nanotubes are arranged with a preferred orientation.

15. The power tool of claim 2, wherein said nanotube actuator comprises at least one layer comprising nanotubes comprising inorganic components other than carbon.

16. The power tool of claim 15, wherein said nanotube actuator comprises at least one layer comprising nanotubes comprising a material selected from the group consisting of BN, $MoS_2$ and $V_2O_5$.

17. The power tool of claim 15, wherein said nanotube actuator comprises at least one layer comprising nanotubes selected from the group consisting of single-wall carbon nanotubes and multi-wall carbon nanotubes.

18. The power tool of claim 2, wherein said nanotube actuator comprises at least one layer structured by a CVD process and being selected from the group consisting of nanotubes and nanotube fibers.

19. A clutch comprising:
a first clutch element;
a second clutch element cooperating with said first clutch element for transmitting a torque, said first and second clutch elements being seated for rotation one relative to the other;
an actuating element engaging at least one of said first and second clutch elements for moving said at least one clutch between a first position, wherein torque is transmitted between said first and second clutch elements, and a second position, wherein torque transmission between said first and second clutch elements is interrupted;
wherein said actuating element comprises a nanotube actuator including at least one layer with nanotubes epitaxially crown between mutually parallel plates.

* * * * *